3,386,905
PREPARATION OF 1,1,1,3 - TETRACHLOROPROPANE WITH HIGH ENERGY IONIZING ELECTROMAGNETIC RADIATION
Charles F. Kohl, Forrest O. Stark, and George E. Vogel, Midland, Mich., assignors to Dow Corning Corporation, Midland, Mich., a corporation of Michigan
No Drawing. Filed Aug. 19, 1964, Ser. No. 390,737
8 Claims. (Cl. 204—163)

ABSTRACT OF THE DISCLOSURE

An economical method for preparing 1,1,1,3-tetrachloropropane by mixing carbon tetrachloride and ethylene in a mole ratio of 1:1 to 10:1 with the initial ethylene pressure being 2 to 15 atmospheres and free from free radical acceptors, heating the mixture to 60° to 130° C. and thereafter radiating the mixture with electromagnetic radiation to provide a dosage of 0.1 to 4.2 megarads. The process provides 70 to 100% 1,1,1,3-tetrachloropropane and any unreacted starting materials can be recycled.

Specification

This invention relates to a method of preparing 1,1,1,3-tetrachloropropane. More specifically, this invention relates to a method of preparing 1,1,1,3-tetrachloropropane by electromagnetic radiation.

Although 1,1,1,3-tetrachloropropane has been prepared by other methods in the prior art, such as by peroxide addition of carbon tetrachloride to ethylene, many problems arise when attempting to use these methods for commercial production. A major and objectionable problem of using the peroxide method is that the carbon tetrachloride cannot be economically recovered from the peroxide residues. In order that the 1,1,1,3-tetrachloropropane can be produced economically the carbon tetrachloride should be recoverable and re-useable in the process. Also the peroxide method is a batch process and the process should be a continuous process for economical reasons.

An object of the present invention is to provide a method of producing 1,1,1,3-tetrachloropropane in good yields. Another object is to provide an economical method of producing 1,1,1,3-tetrachloropropane, such that the carbon tetrachloride is recoverable and re-useable, and such that the carbon tetrachloride can be recycled in a continuous process in the production of 1,1,1,3-tetrachloropropane.

Another object is to provide a method of producing 1,1,1,3-tetrachloropropane by electromagnetic radiation. These and other objects will become apparent from the following description of the present invention and appended claims.

The present invention relates to a method of preparing 1,1,1,3-tetrachloropropane comprising (A) mixing carbon tetrachloride and ethylene in a mole ratio of from 1:1 to 10:1, said mixture having an initial ethylene pressure of from 2 to 15 atmospheres, (B) heating said mixture to from 60° to 130° C., thereafter (C) radiating said mixture with electromagnetic radiation having a wave length of not exceeding 3 Angstrom units to induce a dosage of from 0.1 to 4.2 megarads.

The carbon tetrachloride and ethylene are mixed in a container which can be closed and held at a pressure of 15 atmospheres or above. The carbon tetrachloride, ethylene and container preferably are substantially free from all impurities which are free radical acceptors such as oxygen.

Any method of mixing the carbon tetrachloride and ethylene can be used which excludes the free radical acceptors, especially oxygen. One of the best methods of mixing the two ingredients is to evacuate the container to a very low pressure such as 0.1 to 5 microns of Hg and then to vacuum distill the carbon tetrachloride into the container. The ethylene is then applied to give some specified initial pressure. The ethylene can readily be introduced when the container has been chilled to liquid nitrogen temperature. Another method of mixing is to purge the container with ethylene or nitrogen or some other inert gas until the container is free of oxygen and then the desired amounts of ethylene and carbon tetrachloride can be added. The carbon tetrachloride and ethylene can be placed in any type of unreactive container such that the container will not react with any of the reactants, products or intermediate free radicals. Unreactive containers can be, for example, made from Pyrex glass, glass-lined steel, Hastelloy B, Stainless steel or nickel. The containers should be so constructed as to withstand at least 15 atmospheres' pressure.

The molar ratio of carbon tetrachloride to ethylene is critical in that there must be at least one mole of carbon tetrachloride per mole of ethylene. It is preferable to have at least two moles of carbon tetrachloride per mole of ethylene. The range of molar ratios of carbon tetrachloride to ethylene which are economically operative are 1:1 to 10:1. Preferably, the molar ratio is 2:1 to 5:1. The best results are obtained with a 3:1 mole ratio of carbon tetrachloride to ethylene.

The initial ethylene pressure for the process of this invention is critical. The initial ethylene pressure must be at least two atmospheres. The initial ethylene pressure can be as high as 15 atmospheres. Higher pressures do not significantly increase the yield of 1,1,1,3-tetrachloropropane, but do increase the yield of high molecular weight telomers. Lower initial ethylene pressures than two atmospheres are detrimental to the yield of 1,1,1,3-tetrachloropropane and the amount of ethylene undergoing reaction. Preferably, the initial ethylene pressure is from 2 to 4 atmospheres.

After the carbon tetrachloride and ethylene are mixed in the container the mixture is heated to from 60° to 130° C. The temperature is particularly critical to the present invention. Temperatures lower than 60° C. produce high proportions of telomer compared to the proportion of 1,1,1,3-tetrachloropropane produced. The yield of 1,1,1,3-tetrachloropropane is also very low compared to the yield when 60° C to 130° C is used. No economical advantages are found in operating below 60° C. as the amount of telomer increases and the yield of product is low. Above 130° C. the process is not operative as the product begins decomposing above this temperature. Care must be used in using 130° C. From 120° C. to 130° C. it is advisable to use a nickel container. Decomposition of products occur rapidly at 130° C. when stainless steel containers are used. Above 130° C. the type of container no longer retards the decomposition. Preferably, the mixture of carbon tetrachloride and ethylene is heated to from 100° C. to 120° C.

After the mixture of carbon tetrachloride and ethylene has been heated to from 60° to 130° C., the mixture is radiated with electromagnetic radiation having a wave length of not more than 3 Angstroms. Electromagnetic radiation having wave lengths of more than 3 Angstroms do not have enough energy to be commercially useful in carrying out the reaction between carbon tetrachloride and ethylene. The total dose of electromagnetic radiation is important and low energy radiation is impractical to use. Low energy radiation is also less efficient and thus more costly. The results from using electromagnetic radiation with wave lengths greater than 3 Angstroms are poor.

Electromagnetic radiation is preferably either gamma-radiation or X-radiation. The most preferred range of wave lengths of gamma-radiation and X-radiation for this invention is from 3 Angstroms to 0.005 Angstrom. The gamma-radiation can be obtained from any gamma-ray emitting source such as cobalt-60 or cesium-137. X-radiation can be obtained from any source providing wave lengths of not greater than 3 Angstroms. The sources of X-rays are well known to the art.

The amount of dosage required is at least 0.1 megarads. The range of dosage operable is from 0.1 to 4.2 megarads. Lower dosages tend to produce higher quantities of telomer and lower amounts of 1,1,1,3-tetrachloropropane. Higher dosages than 4.2 megarads do not increase the yield enough to make larger doses economical. Also dosages higher than 4.2 megarads break down the product. Preferably, the dosage is from 0.75 to 2 megarads.

The process of this invention is particularly useful for producing 1,1,1,3-tetrachloropropane. The yield of 1,1,1,3-tetrachloropropane is from 30 to 60 mol percent based on the initial moles of ethylene used. The amount of telomers formed are very low which is completely unexpected from the prior art. The product mixture consists of 0 to 30 mole percent telomers and 70 to 100 mole percent 1,1,1,3-tetrachloropropane. Varying the process conditions outside the limits set forth above, lowers the yield of 1,1,1,3-tetrachloropropane and increases the amount of telomers in the product mixture.

The process of this invention is particularly useful in that the product and by-products can readily be fractionated from the carbon tetrachloride. The carbon tetrachloride can be recycled, thus further reducing the cost of production and providing an economical method for producing 1,1,1,3-tetrachloropropane. The ease with which the carbon tetrachloride can be separated from the product and by-products provides an advantageous requirement for a continuous process.

The process as described above is a very efficient process. The efficiency of a reaction conducted by radiation is frequently measured by a G value which is defined as the number of molecules changed per 100 e.v. in the form of ionizing energy in the ethylene-carbon tetrachloride mixture. G values determined for the amount of 1,1,1,3-tetrachloropropane formed instead of the amount of ethylene converted is about 1000 to 1500 for the process of this invention.

The product, 1,1,1,3-tetrachloropropane, is well known in the art and can be used in accordance with known uses.

The following examples are illustrative only and should not be construed as limiting the invention which is properly delineated in the appended claims.

Example 1

A 95 cc. nickel reaction container was evacuated to one micron of Hg 3.37 cc. of carbon tetrachloride was vacuum distilled into the evacuated container. Ethylene at 539 mm. of Hg having a volume of 402 cc. was put into the container which had previously been chilled to liquid nitrogen temperature. The container was then sealed and heated to 110° C. and maintained at this temperature until the mixture had received a dosage of one megarad of gamma-radiation from a cobalt-60 source. The radiation source was removed after the dose was obtained. The container was chilled to liquid nitrogen temperature before removing the reaction products. The reaction mixture was separated by fractional distillation. There was 38 mol percent of 1,1,1,3-tetrachloropropane produced and 5 mol percent of telomer. The amount of ethylene consumed was 48 mol percent. The product mixture contained 88.4 mol percent 1,1,1,3-tetrachloropropane.

Example 2

A 5.8 cc. stainless steel container was evacuated as in Example 1. 0.206 cc. of $CCl_4$ was vacuum distilled into the evacuated container. Ethylene at 25.5 mm. of Hg having a volume of 518 cc. was put into the container which had previously been chilled to liquid nitrogen temperature. The container was then heated to 105° C. and maintained at this temperature until a dosage of one megarad of gamma-radiation was received from a cobalt-60 source. The container was chilled as in Example 1 and 48 mol percent of $Cl_3CCH_2CH_2Cl$ was obtained. With 88 mole percent of the ethylene converted only 20 mole percent of telomers was formed. The product mixture contained 70.6 mole percent $Cl_3CCH_2CH_2Cl$.

Example 3

The following ratios of carbon tetrachloride and ethylene were reacted according to Example 1. The variation in the process which were used are included in the following table and the yields are indicated.

| Run | Mole ratio of $CCl_4/H_2C=CH_2$ | Initial $H_2C=CH_2$ Pressure in atm. | Container Material | Temp., ° C. | Dose, Megarads | Mole percent $H_2C=CH_2$ converted | Mole of percent $Cl_2CCH_3CH_2Cl$ obtained | Mole percent of product mixture which is $Cl_3CCH_2CH_2Cl$ |
|---|---|---|---|---|---|---|---|---|
| 1 | 3/1 | 3 | Hastelloy B | 110 | 1.0 | 52.0 | 40.0 | 87.0 |
| 2 | 3/1 | 3 | do | 110 | 2.0 | 76.0 | 58.0 | 76.3 |
| 3 | 3/1 | 3 | Stainless steel | 105 | 1.0 | 31.0 | 30.0 | 98.4 |
| 4 | 3/1 | 10 | do | 105 | 1.0 | 78.0 | 54.0 | 81.8 |
| 5 | 3/1 | 3 | do | 110 | 1.0 | 62.0 | 42.0 | 80.8 |
| 6 | 3/1 | 3 | do | 120 | 2.0 | 55.0 | 33.0 | 84.6 |
| 7 | 3/1 | 3 | Pyrex glass | 62 | 1.0 | 53.0 | 27.0 | 67.5 |
| 8 | 3/1 | 3 | do | 93 | 1.0 | 59.0 | 33.0 | 71.7 |
| 9 | 3/1 | 3 | do | 112 | 1.0 | 52.0 | 40.0 | 87.0 |
| 10 | 3/1 | 15 | Nickel | 110 | 1.0 | 88.0 | 46.0 | 68.6 |
| 11 | 3/1 | 3 | do | 106 | 2.0 | 69.0 | 53.0 | 86.9 |

Example 4

When a mole ratio of carbon tetrachloride to ethylene is 1:1 and the procedure according to Example 1 is used, equivalent results are obtained when a nickel container is used and a temperature of 100° C.

Example 5

When carbon tetrachloride and ethylene having an initial pressure of 3 atmospheres are mixed in a nickel container in accordance with Example 1 and when the following procedure variations are used equivalent results are obtained. The electromagnetic radiation is from X-radiation being emitted by a titanium target.

| | Mole ratio of $CCl_4/H_2C=CH_2$ | Temperature, ° C. | Dose, Megarads |
|---|---|---|---|
| 1 | 5/1 | 130 | 0.75 |
| 2 | 10/1 | 100 | 4.2 |
| 3 | 4/1 | 120 | 1.5 |
| 4 | 8/1 | 104 | 0.1 |
| 5 | 2/1 | 78 | 3.6 |

Example 6

When the process according to Example 1 is followed except that the radiation source is from X-radiation emitted from a copper or zirconium target, equivalent results are obtained. The 1,1,1,3-tetrachloropropane can be used to produce 1,1,1-trichloropropane by extracting HCl.

The 1,1,1-trichloropropane is useful as a monomer in producing chlorinated polymers.

That which is claimed is:

1. A method of preparing 1,1,1,3-tetrachloropropane comprising
   (A) mixing carbon tetrachlororide and ethylene in a mole ratio of from 1:1 to 10:1, said mixture being substantially free from free radical acceptors and having an initial ethylene pressure of from 2 to 15 atmospheres,
   (B) heating said mixture to 60° C. to 130° C., thereafter,
   (C) radiating said mixture with electromagnetic radiation having a wave length not exceeding 3 Angstrom units to induce a dosage of 0.1 to 4.2 megarads.

2. The method in accordance with claim 1 wherein the electromagnetic radiation is gamma radiation.

3. The method in accordance with claim 1 wherein the electromagnetic radiation has a wave length of from 3 to 0.005 Angstrom units.

4. The method in accordance with claim 3 wherein the electromagnetic radiation is X-radiation.

5. A method of preparing 1,1,1,3-tetrachloropropane comprising
   (A) mixing carbon tetrachloride and ethylene in a mole ratio of from 2:1 to 5:1, said mixture being substantially free from free radical acceptors and having an initial ethylene pressure of from 2 to 4 atmospheres,
   (B) heating said mixture to 100° to 120° C., thereafter,
   (C) radiating said mixture with gamma radiation having a wave length not exceeding 3 Angstrom units to induce a dosage of 0.75 to 2 megarads.

6. The method in accordance with claim 5 in which the gamma radiation has a wave length of from 3 to 0.005 Angstrom units.

7. A method of preparing 1,1,1,3-tetrachloropropane comprising
   (A) mixing carbon tetrachloride and ethylene in a mole ratio of from 1:1 to 10:1, in a closed unreactive container, said mixture being substantially free from free radical acceptors and having an initial ethylene pressure of from 2 to 15 atmospheres,
   (B) heating said mixture to 60° C. to 130° C., thereafter,
   (C) radiating said mixture with electromagnetic radiation having a wave length not exceeding 3 Angstrom units to induce a dosage of 0.1 to 4.2 megarads,
   (D) separating the unreacted carbon tetrachloride by distillation from 1,1,1,3-tetrachloropropane and telomers to obtain carbon tetrachloride substantially free from impurities, and
   (E) putting the carbon tetrachloride obtained from (D) back into the mixture of (A).

8. A method of preparing 1,1,1,3-tetrachloropropane comprising
   (A) mixing carbon tetrachloride and ethylene in a mole ratio of 3:1, said mixture being substantially free from free radical acceptors and having an initional ethylene pressure of 3 atmospheres,
   (B) heating said mixture to 105° to 115° C., thereafter,
   (C) radiating said mixture with gamma radiation from cobalt-60 to induce a dosage of 1 to 2 megarads.

References Cited

Chemical Abstract, vol. 57, October 1962, pp. 10682i and 10683a.

Chemical Abstract, vol. 58, April 1963, p. 8885e.

HOWARD S. WILLIAMS, *Primary Examiner*.